(12) United States Patent  (10) Patent No.: US 8,489,094 B2
Snapp  (45) Date of Patent: Jul. 16, 2013

(54) SYSTEM AND METHOD FOR PROVIDING LOCATION INFORMATION TO A MOBILE CALLING UNIT

(75) Inventor: John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 489 days.

(21) Appl. No.: 12/534,201

(22) Filed: Aug. 3, 2009

(65) Prior Publication Data

US 2011/0028158 A1  Feb. 3, 2011

(51) Int. Cl.
H04W 4/00 (2009.01)
(52) U.S. Cl.
USPC ............ 455/435.1; 455/456.1; 455/432.1; 455/433; 455/435.3; 455/566
(58) Field of Classification Search
USPC ............ 455/456.1, 432.1, 433, 434, 435.1, 455/435.2, 566; 701/207, 208, 212, 213
See application file for complete search history.

(56) References Cited

U.S. PATENT DOCUMENTS

| | | | |
|---|---|---|---|
| 5,636,245 | A | 6/1997 | Ernst et al. |
| 6,437,735 | B1 | 8/2002 | McMahan |
| 6,522,250 | B1 | 2/2003 | Ernst et al. |
| 6,915,208 | B2 | 7/2005 | Garin et al. |
| 6,937,865 | B1 | 8/2005 | Bloebaum et al. |
| 2002/0164995 | A1* | 11/2002 | Brown et al. ............ 455/456 |
| 2009/0061870 | A1* | 3/2009 | Finkelstein et al. ...... 455/435.2 |

* cited by examiner

*Primary Examiner* — Manpreet Matharu

(57) ABSTRACT

A system for providing location information to a mobile calling unit operating within or among a plurality of communication networks includes at least one communication access unit for each respective network of the plurality of communication networks. The calling unit effects communications with a respective communication network of the plurality of communicate networks via a respective communication access unit of the at least one communication access unit. The respective communication network and the respective communication access unit cooperate to automatically effect providing at least one almanac entry to the calling unit substantially on occurrence of a predetermined event. The at least one almanac entry relates to geographic location of the calling unit while the calling unit effects the communications.

20 Claims, 3 Drawing Sheets

SYSTEM AND METHOD FOR PROVIDING LOCATION INFORMATION TO A MOBILE CALLING UNIT

FIELD OF THE INVENTION

The present invention is directed to telecommunication systems, and especially to telecommunication systems providing location information to mobile calling units operating within a network.

BACKGROUND OF THE INVENTION

Significant traffic may occur in a wireless communication network carrying out "overhead" items having little to do with conveying a user's message traffic between a mobile unit and a receiving station. Among such overhead are communications relating to advising the mobile unit of its location. Such location information may be useful in various circumstances such as, by way of example and not by way of limitation, emergency service calling or other service-related calling.

It would be useful to reduce overhead traffic occurring in a wireless communication network. One way to effect such a traffic reduction is to provide for a mobile unit to manage its own location information with minimal inter-network communication required to support such a location function.

There is a need for a system and method for providing location information to a mobile calling unit that reduces the amount of overhead traffic occurring in a communication network.

SUMMARY OF THE INVENTION

A system for providing location information to a mobile calling unit operating within or among a plurality of communication networks includes at least one communication access unit for each respective network of the plurality of communication networks. The calling unit effects communications with a respective communication network of the plurality of communicate networks via a respective communication access unit of the at least one communication access unit. The respective communication network and the respective communication access unit cooperate to automatically effect providing at least one almanac entry to the calling unit substantially on occurrence of a predetermined event. The at least one almanac entry relates to geographic location of the calling unit while the calling unit effects the communications.

A method for providing location information to a mobile calling unit operating within or among a plurality of communication networks includes: (a) providing at least one communication access unit for each respective network of the plurality of communication networks; (b) operating the calling unit to effect communications with a respective communication network of the plurality of communicate networks via a respective communication access unit of the at least one communication access unit; and (c) operating the respective communication network and the respective communication access unit cooperatively to automatically effect providing at least one almanac entry to the calling unit substantially on occurrence of a predetermined event. The at least one almanac entry relates to geographic location of the calling unit while the calling unit effects the communications.

It is, therefore, a feature of the present invention to provide a system and method for providing location information to a mobile calling unit that reduces the amount of overhead traffic occurring in a communication network.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Wireless communication systems provide a wireless link between a mobile calling unit and a land-line network such as, by way of example and not by way of limitation, a Public Switched Telephone Network (PSTN), an internet protocol (IP) network or another communication network. A termination point or unit is employed to provide an interface between wireless communications and land-line communications. Such termination points or units may include cellular telephone towers, other Radio Access Networks (RAN) or other Unlicensed Mobile Access (UMA) Networks (UMAN). Such termination points or units generally remain substantially stationary while operating and can be substantially associated with a particular geographic location.

Figure 1:
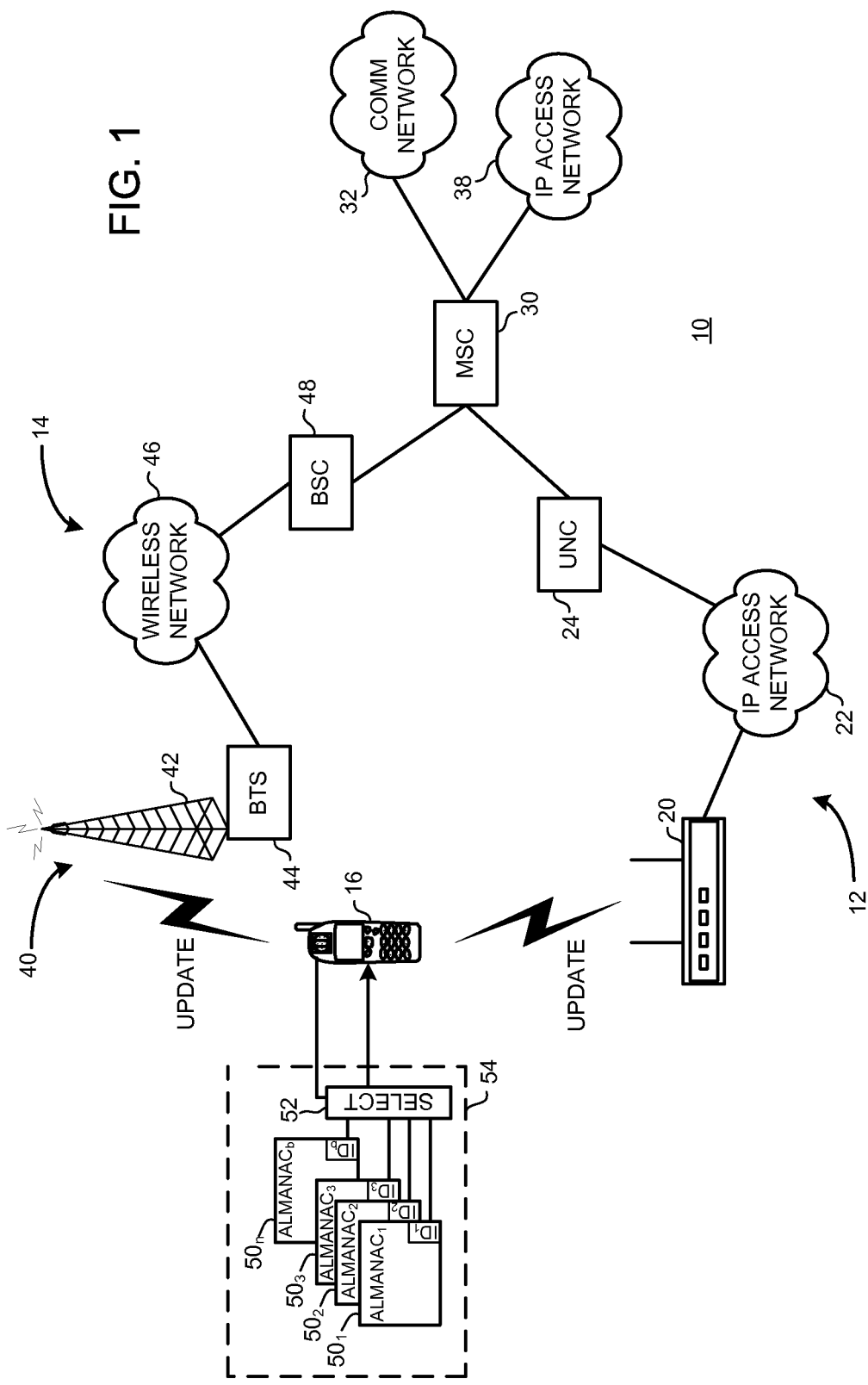
FIG. 1 is a schematic diagram illustrating a system for providing location information to a mobile calling unit.

FIG. 1 is a schematic diagram illustrating a system for providing location information to a mobile calling unit. In FIG. 1, a telecommunication system 10 includes an Unlicensed Mobile Access (UMA) Network (UMAN) 12 and a Radio Access Network (RAN) 14. UMAN 12 may be embodied in, by way of example and not by way of limitation, a Wi-Fi network, a Bluetooth network or another type of UMA. RAN 14 may be embodied in, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 12 and RAN 14 are configured for wireless communication with a wireless calling unit 16.

UMAN 12 includes an access unit 20 coupled with an Internet Protocol (IP) network 22. Access unit 20 facilitates communication between wireless communicating unit 16 and IP network 22. IP network 22 is coupled with a UMA Network Controller (UNC) 24. UNC 24 is coupled with a Mobile Switching Center (MSC) 30. MSC 30 is coupled with a communication network 32. MSC 30 may also be coupled with an IP network 38 or another network such as by way of example and not by way of limitation, a Public Switched Telephone Network (PSTN; not shown in FIG. 1).

RAN 14 includes an access unit 40 that includes a radio antenna embodied in a radio tower 42 and a Base Transceiver Station (BTS) 44 coupled with radio tower 42. BTS 44 is coupled with a private network 46. Private network 46 may be embodied in, by way of example and not by way of limitation, a cellular network or a PCS network employing any of several communication protocols including, by way of further example and not by way of limitation, GSM or another protocol using Time Division Multiple Access (TDMA), Code Division Multiple Access (CDMA) or another coding scheme. Access unit 40 facilitates communication between calling unit 16 and private network 46. Private network 46 is coupled with a Base Station Controller (BSC) 48. BSC 48 is coupled with MSC 30.

Calling unit 16 may wirelessly access UMAN 12 to place a call via access unit 20 to establish communication via IP network 22, UNC 24, MSC 30 and communication network 32, or IP network 38 or another network. Calling unit 16 may instead wirelessly access RAN 14 to place a call via access unit 40 to establish communication via private network 46, BSC 48, MSC 30 and communication network 32, IP network 38 or another network.

Substantially on occurrence of a predetermined event such as, by way of example and not by way of limitation, commencing communication with access unit 20 or access unit 40, location information relating to locus of access unit 20 or access unit 40 may be provided to calling unit 16. Location information may be expressed in, by way of example and not by way of limitation, latitude-longitude, another X-Y locating scheme, an access point identification such as MAC (Media Access Control) address, street address or another locator, or a combination of such locators.

If calling unit 16 roams so as to establish communications with another access point (not shown in FIG. 1), after calling unit 16 successfully connects with a new access point 20, 40, new location information relating to calling unit 16 may be sent to calling instrument or unit 16.

Location information may be provided to calling unit 16 in the form of one or more almanacs $50_1$, $50_2$, $50_3$, $50_b$. The indicator "b" is employed to signify that there can be any number of almanacs provided to calling unit 16. The inclusion of four almanacs $50_1$, $50_2$, $50_3$, $50_b$ in FIG. 1 is illustrative only and does not constitute any limitation regarding the number of almanacs that may be provided to calling unit 16 in a telecommunication system employing the present invention. Throughout this description, use of a reference numeral using a generic subscript herein may be taken to mean that any respective member of the plurality of elements having the same reference numeral may be regarded as included in the description. Thus, by way of example and not by way of limitation, referring to almanac $50_b$ in describing FIG. 1 may be taken to mean that any almanac—$50_1$, $50_2$, $50_3$, $50_b$ (FIG. 1)—may be regarded as capable of employment as described.

Each almanac $50_b$ may include a respective identification $ID_b$ for indicating which access point 20, 40 is related with the geographic information contained in the respective almanac $50_b$. Almanacs $50_b$ may include partial almanacs if desired.

Preferably almanacs $50_b$ are stored in a storage unit 54 in calling unit 16. Almanacs $50_b$ may be selectively accessed via a select unit 52.

Figure 2:
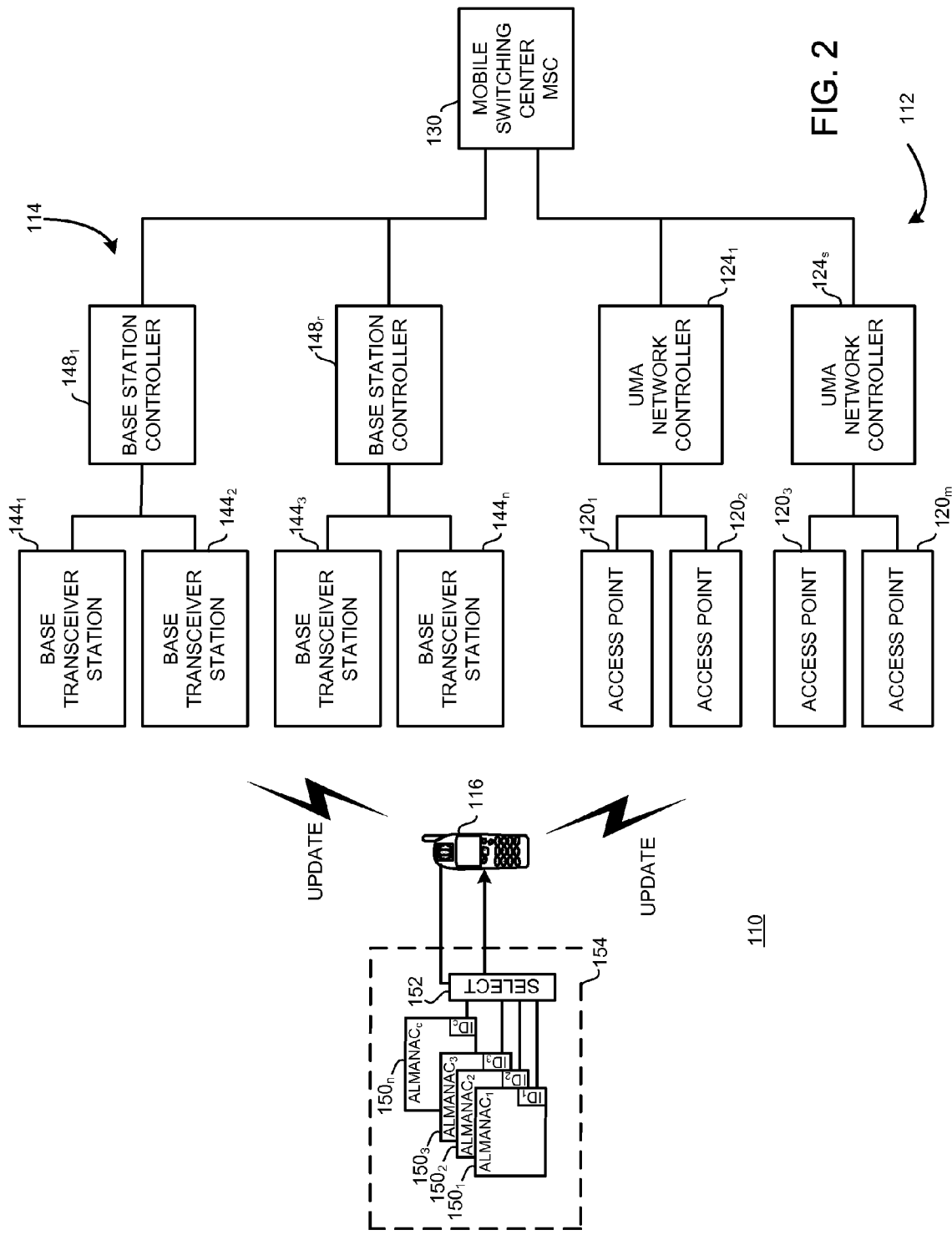
FIG. 2 is a schematic diagram illustrating representative call flows that may be employed with the system illustrated in FIG. 1.

FIG. 2 is a schematic diagram illustrating call routing for a system configured according to the teaching of the present invention deployed in a representative multi-network arrangement. In FIG. 2, a telecommunication system 110 includes an Unlicensed Mobile Access (UMA) Network (UMAN) 112 and a Radio Access Network (RAN) 114. UMAN 112 may include, by way of example and not by way of limitation, a Wi-Fi network, a Bluetooth network or another type of UMA. RAN 114 may include, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 112 and RAN 114 are configured for wireless communication with a wireless calling unit or instrument 116.

UMAN 112 includes access units $120_1$, $120_2$, $120_3$, $120_m$ coupled for call routing via an Internet Protocol (IP) network (not shown in FIG. 2; see IP network 22, FIG. 1). The indicator "m" is employed to signify that there can be any number of access units in telecommunication system 110. The inclusion of four access units $120_1$, $120_2$, $120_3$, $120_m$ in FIG. 2 is illustrative only and does not constitute any limitation regarding the number of access units that may be included in a telecommunication system employing the present invention. Access units $120_1$, $120_2$, $120_3$, $120_m$ facilitate communication with a wireless communicating unit 116. Calls from access units $120_1$, $120_2$ may be placed with a UMA Network Controller (UNC) $124_1$. Calls from access units $120_3$, $120_m$ may be placed with a UMA Network Controller (UNC) $124_s$. The indicator "s" is employed to signify that there can be any number of UNCs in telecommunication system 110. The inclusion of two UNCs $124_1$, $124_s$ in FIG. 2 is illustrative only and does not constitute any limitation regarding the number of UNCs that may be included in a telecommunication system employing the present invention. UNCs $124_1$, $124_s$ are coupled with a Mobile Switching Center (MSC) 130. MSC 130 is coupled for call routing with a receiving or called party such as, by way of example and not by way of limitation, PSAP 134 via a communication network (not shown in FIG. 2; see communication network 30 and IP network 38; FIG. 1).

RAN 114 includes access units represented in FIG. 2 by Base Transceiver Stations (BTS) $144_1$, $144_2$, $144_3$, $144_n$. The indicator "n" is employed to signify that there can be any number of BTSs in telecommunication system 110. The inclusion of four BTSs $144_1$, $144_2$, $144_3$, $144_n$ in FIG. 2 is illustrative only and does not constitute any limitation regarding the number of BTSs that may be included in a telecommunication system employing the present invention.

BTSs $144_1$, $144_2$, $144_3$, $144_n$ are coupled for call routing with MSC 130 via a private network (not shown in FIG. 2; see private network 46, FIG. 1). BTSs $144_1$, $144_2$, $144_3$, $144_n$ facilitate communication with wireless communicating unit 116. BTSs $144_1$, $144_2$, $144_3$, $144_n$ are coupled with a Base Station Controllers (BSC) $148_1$, $148_r$. The indicator "r" is employed to signify that there can be any number of BSCs in telecommunication system 110. The inclusion of two BSCs $148_1$, $148_r$ in FIG. 2 is illustrative only and does not constitute any limitation regarding the number of BSCs that may be included in a telecommunication system employing the present invention. BSCs $148_1$, $148_r$ are coupled with MSC 130.

Calling unit 116 may wirelessly access UMAN 112 to place a call via an access unit $120_1$, $120_2$, $120_3$, $120_m$ to establish communication via a UNC $124_1$, $124_s$ and MSC 130. Calling unit 116 may instead wirelessly access RAN 114 to place a call via a BTS $144_1$, $144_2$, $144_3$, $144_n$ to establish communication via a BSC $148_1$, $148_r$ and MSC 130. Location may be indicated in latitude-longitude, Global Positioning System (GPS) or another system giving an X-Y location indication to calling unit 116.

Substantially on occurrence of a predetermined event such as, by way of example and not by way of limitation, commencing communication with an access unit $120_m$ or BTS $144_n$, location information relating to locus of access unit $120_m$ or BTS $144_n$ may be provided to calling unit 116. Location information may be expressed in, by way of example and not by way of limitation, latitude-longitude, another X-Y locating scheme, an access point identification such as MAC (Media Access Control) address, street address or another locator, or a combination of such locators.

Location information may be provided to calling unit 116 in the form of one or more almanacs $150_1$, $150_2$, $150_3$, $150_c$. The indicator "c" is employed to signify that there can be any number of almanacs provided to calling unit 116. The inclusion of four almanacs $150_1$, $150_2$, $150_3$, $150_c$ in FIG. 2 is illustrative only and does not constitute any limitation regarding the number of almanacs that may be provided to calling unit 116 in a telecommunication system employing the present invention.

Each almanac $150_c$ may include a respective identification $ID_c$ for indicating which access point $144_n$, $120_m$ is related with the geographic information contained in the respective almanac $150_c$. Almanacs $150_c$ may include partial almanacs if desired. Preferably almanacs $150_c$ are stored in a storage unit 154 in calling unit 116. Almanacs $150_c$ may be selectively accessed via a select unit 152.

The present invention provides a system and method by which a calling unit 16, 116 such as, by way of example and not by way of limitation, a wireless handset can determine its location based upon an almanac $50_b$, $150_c$ that is uploaded to calling unit 16, 116 from the network via a termination point or unit 20, 40, $144_n$, $120_m$. The almanac $50_b$, $150_c$ includes at least one almanac entry relating to geographic location of the calling unit 16, 116. A calling unit 16, 116 may detect that it is in a new service area (i.e. services by a new termination point or unit) when calling unit 16, 116 detects a new identifier characteristic received from the termination point or unit 20, 40, $144_n$, $120_m$. Such a characteristic may include, by way of example and not by way of limitation, identification signals such as Location Area Code (LAC), Mobile Switching Center IDentification (MSCID), Mobile Network Code (MNC) or another "overhead" code included in signaling from the currently communicating termination point or unit 20, 40, $144_n$, $120_m$. Calling unit 16, 116 can receive an almanac $50_b$, $150_c$ that includes geographic information relating to the area in which the termination point or unit 20, 40, $144_n$, $120_m$ is situated.

Alternatively, the termination point or unit 20, 40, $144_n$, $120_m$ may identify a calling unit 16, 116 as newly entered within its service area and may automatically provide geographic information to the newly arrived calling unit 16, 116. The termination point or unit 20, 40, $144_n$, $120_m$ may periodically provide geographic information to a calling unit 16, 116. An important advantage of the present invention is a reduction of overhead message traffic between a calling unit 16, 116 and a termination point or unit 20, 40, $144_n$, $120_m$ such as may occur in prior art systems in which location information is periodically, often frequently, requested by a calling unit 16, 116 from a termination point or unit 20, 40, $144_n$, $120_m$. In contrast, the present invention reduces such request-and-reply location-related traffic.

Geographic information may relate to cell site location, cell sector locations associated with the cell site, neighboring cell site and sector location information, a location for an access point associated with a Unlicensed Mobile Access (UMA) Networks (UMAN) or other geographic information. It is preferred that geographic information included in an almanac $50_b$, $150_c$ relate X-Y location information. X-Y information may be expressed in latitude-longitude, Global Positioning System (GPS) coordinates, radio navigation system coordinates, celestial navigation information or other information serving to identify a particular locus or locale.

When geographic information is provided to a calling unit 16, 116, calling unit 16, 116 may store the received geographic information (e.g., in one or more almanacs $50_b$, $150_c$) so that when calling unit 16, 116 communicates with a new termination point or unit 20, 40, $144_n$, $120_m$ such as, by way of example and not by way of limitation, when the calling unit moves to a new cell or sector calling unit 16, 116 will have geographic X-Y information relating to the new termination point or unit 20, 40, $144_n$, $120_m$ with which calling unit 16, 116 is newly communicating. Calling unit 16, 116 may be configured to store multiple almanacs $50_b$, $150_c$ or portions of almanacs so that it is not necessary to request new almanacs as calling unit 16, 116 moves around frequently traveled areas. Calling unit 16, 116 could also request almanac entries relating to geographic location of an individual cell, if desired. Calling unit 16, 116 could maintain a generally static database (e.g., almanac or almanacs $50_b$, $150_c$) that contained geographic information relating to cells or other access points with which calling unit 16, 116 normally operates. Once created, there would be no network traffic necessary for calling unit 16, 116 to determine its own location.

The present invention provides a capability for a mobile communication unit to determine its own location with reduced network involvement and reduced communication traffic. Periodic location queries by a calling unit or by a termination point or unit may be significantly reduced. Privacy issues may be reduced and network overhead may be reduced.

Figure 3:
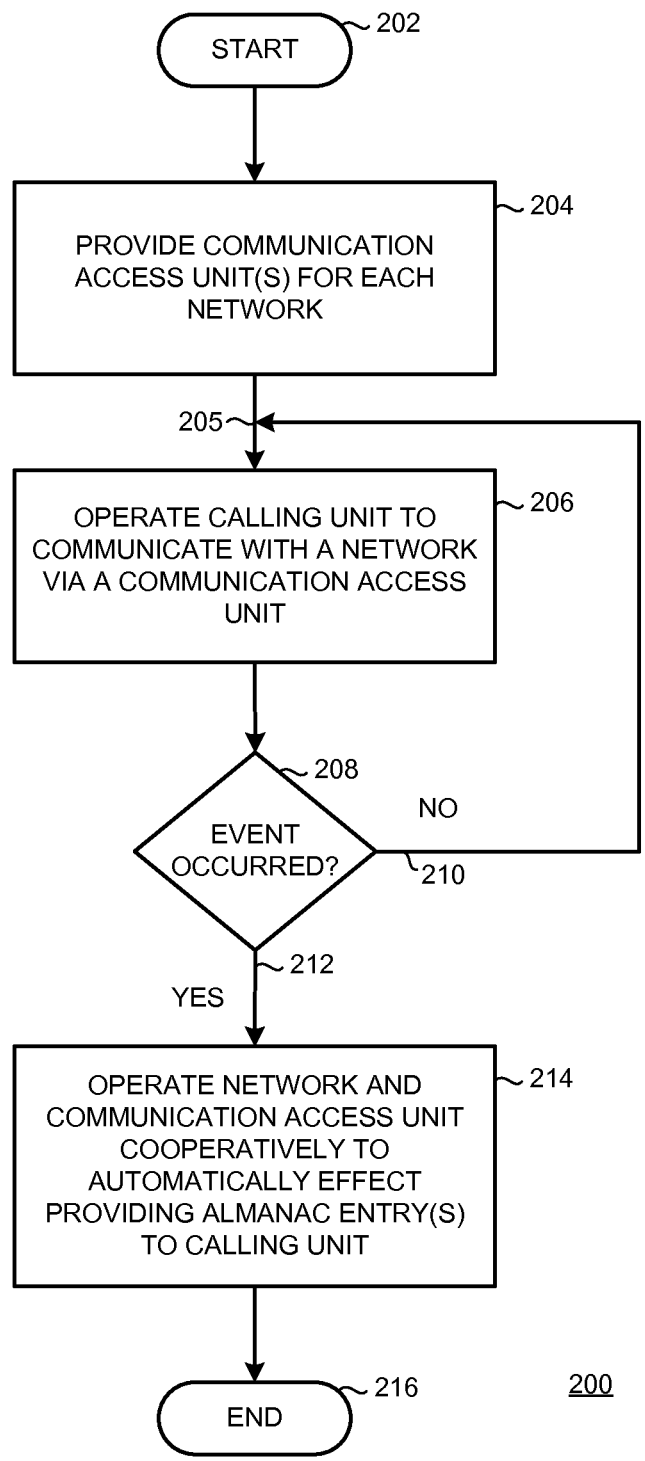
FIG. 3 is a flow diagram illustrating a method for providing location information to a mobile calling unit.

FIG. 3 is a flow diagram illustrating a method for providing location information to a mobile calling unit. In FIG. 3, a method 200 for providing location information to a mobile calling unit operating within or among a plurality of communication networks begins at a START locus 202. Method 200 continues with providing at least one communication access unit for each respective network of the plurality of communication networks, as indicated by a block 204.

Method 200 continues with operating the calling unit to effect communications with a respective communication network of the plurality of communicate networks via a respective communication access unit of the at least one communication access unit, as indicated by a block 206.

Method 200 continues with posing a query whether a predetermined event has occurred, as indicated by a query block 208. If the predetermined event has not occurred, method 200 proceeds from query block 208 via a NO response line 210 and method 200 returns to a locus 205. Method 200 proceeds from locus 205 to carry out steps represented by blocks 206, 208.

If the predetermined event has occurred, method 200 proceeds from query block 208 via a YES response line 212 and method 200 continues with operating the respective communication network and the respective communication access unit cooperatively to automatically effect providing at least one almanac entry to the calling unit substantially on occurrence of a predetermined event, as indicated by a block 214. The at least one almanac entry relates to geographic location of the calling unit while the calling unit effects the communications. Method 200 terminates at an END locus 216.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for providing location information to a mobile calling unit movingly operating within or among a plurality of communication networks; the system comprising: at least one communication access unit for each respective communication network of said plurality of communication networks; said calling unit effecting communications with a plurality of respective contacted communication networks of said plurality of communication networks during said movingly operating via a plurality of respective contacted communication access units of said at least one communication access unit; each said respective contacted communication network and a respective said contacted communication access unit cooperating to effect providing geographic location of said respective contacted communication access unit to said calling unit when said calling unit substantially commences communicating with said respective contacted communication access unit;

said calling unit storing said geographic information received from a plurality of said respective contacted communication access units in a database as said calling unit effects said movingly operating; said database having a plurality of almanacs for access by said calling unit; each said respective contacted communication access unit being associated with at least one respective almanac of said plurality of almanacs as a previously encountered communication access unit; said calling unit employing said database to determine location of said calling unit as communication is established with a respective said previously encountered communication access unit without querying said previously encountered communication access unit regarding geographic location.

2. The system for providing location information to a mobile calling unit operating within or among a plurality of communication networks as recited in claim 1 wherein said geographic location is expressed as an X-Y location.

3. The system for providing location information to a mobile calling unit operating within or among a plurality of communication networks as recited in claim 2 wherein said X-Y location is expressed in terms of at least one of latitude-longitude, radio frequency navigation system coordinates, and satellite navigation system coordinates.

4. The system for providing location information to a mobile calling unit operating within or among a plurality of communication networks as recited in claim 1 wherein said respective communication access unit is embodied in a cellular network base transceiver station.

5. The system for providing location information to a mobile calling unit operating within or among a plurality of communication networks as recited in claim 4 wherein said geographic location is expressed as an X-Y location.

6. The system for providing location information to a mobile calling unit operating within or among a plurality of communication networks as recited in claim 5 wherein said X-Y location is expressed in terms of at least one of latitude-longitude, radio frequency navigation system coordinates, and satellite navigation system coordinates.

7. The system for providing location information to a mobile calling unit operating within or among a plurality of communication networks as recited in claim 1 wherein said respective communication access unit is embodied in an access unit coupled for call routing via an Internet Protocol network to an Unlicensed Mobile Access Network or Global Area Network.

8. The system for providing location information to a mobile calling unit operating within or among a plurality of communication networks as recited in claim 7 wherein said geographic location is expressed as an X-Y location.

9. The system for providing location information to a mobile calling unit operating within or among a plurality of communication networks as recited in claim 8 wherein said X-Y location is expressed in terms of at least one of latitude-longitude, radio frequency navigation system coordinates, and satellite navigation system coordinates.

10. A system for providing location information to a mobile calling unit movingly operating within or among a plurality of communication networks; the system comprising: at least one communication access unit for each respective communication network of said plurality of communication networks; said calling unit effecting communications with a plurality of respective contacted communication networks of said plurality of communication networks during said movingly operating via a plurality of respective contacted communication access units of said at least one communication access unit; each said respective contacted communication network and a respective said contacted communication access unit cooperating to automatically effect providing geographic location of said respective contacted communication access unit to said calling unit substantially on occurrence of a predetermined event while said calling unit effects said communications within said respective contacted communication network;

said calling unit storing said geographic information received from a plurality of said respective contacted communication access units in a database as said calling unit effects said movingly operating; said database having a plurality of almanacs for access by said calling unit; each said respective contacted communication access unit being associated with at least one respective almanac of said plurality of almanacs as a previously encountered communication access unit; said calling unit employing said database to determine location of said calling unit as communication is established with a respective said previously encountered communication access unit without querying said previously encountered communication access unit regarding geographic location.

11. The system for providing location information to a mobile calling unit operating within or among a plurality of communication networks as recited in claim 10 wherein said predetermined event is at least one of a beginning of effecting said communication and an elapsing of a predetermined time interval.

12. The system for providing location information to a mobile calling unit operating within or among a plurality of communication networks as recited in claim 10 wherein said respective communication access unit is embodied in one of a cellular network base transceiver station and an access unit coupled for call routing via an Internet Protocol network to an Unlicensed Mobile Access Network or Global Area Network.

13. The system for providing location information to a mobile calling unit operating within or among a plurality of communication networks as recited in claim 11 wherein said respective communication access unit is embodied in one of a cellular network base transceiver station and an access unit coupled for call routing via an Internet Protocol network to an Unlicensed Mobile Access Network or Global Area Network.

14. The system for providing location information to a mobile calling unit operating within or among a plurality of communication networks as recited in claim 10 wherein said geographic location is expressed as an X-Y location.

15. The system for providing location information to a mobile calling unit operating within or among a plurality of communication networks as recited in claim 11 wherein said geographic location is expressed as an X-Y location.

16. The system for providing location information to a mobile calling unit operating within or among a plurality of communication networks as recited in claim 14 wherein said respective communication access unit is embodied in one of a cellular network base transceiver station and an access unit coupled for call routing via an Internet Protocol network to an Unlicensed Mobile Access Network or Global Area Network.

17. The system for providing location information to a mobile calling unit operating within or among a plurality of communication networks as recited in claim 15 wherein said respective communication access unit is embodied in one of a cellular network base transceiver station and an access unit coupled for call routing via an Internet Protocol network to an Unlicensed Mobile Access Network or Global Area Network.

18. A method for providing location information to a mobile calling unit movingly operating within or among a plurality of communication networks; the method comprising:
  (a) providing at least one communication access unit for each respective network of said plurality of communication networks;
  (b) operating said calling unit to effect communications with a plurality of respective contacted communication networks of said plurality of communication networks during said movingly operating via a plurality of respective contacted communication access units of said at least one communication access unit;
  (c) operating each said respective contacted communication network and each said respective contacted communication access unit cooperatively to automatically effect providing geographic location of said respective contacted communication access unit to said calling unit substantially on occurrence of a predetermined event while said calling unit effects said communications within said respective contacted communication network;
  (d) automatically storing said geographic information received from a plurality of said respective contacted communication access units in a database as said calling unit effects said movingly operating; said database having a plurality of almanacs in said calling unit for access by said calling unit; each said respective contacted communication access unit being associated with at least one respective almanac of said plurality of almanacs as a previously encountered communication access unit; and
  (e) operating said calling unit to employ said database to determined location of said calling unit as communication is established with a respective said previously encountered communication access unit without querying said previously encountered communication access unit regarding geographic location.

19. The method for providing location information to a mobile calling unit operating within or among a plurality of communication networks as recited in claim 18 wherein said respective communication access unit is embodied in one of a cellular network base transceiver station and an access unit coupled for call routing via an Internet Protocol network to an Unlicensed Mobile Access Network or Global Area Network.

20. The method for providing location information to a mobile calling unit operating within or among a plurality of communication networks as recited in claim 19 wherein said predetermined event is at least one of a beginning of effecting said communication and an elapsing of a predetermined time interval, and wherein said geographic location is expressed as an X-Y location.

\* \* \* \* \*